United States Patent
Lu et al.

(10) Patent No.: US 10,289,978 B2
(45) Date of Patent: May 14, 2019

(54) METHOD AND APPARATUS FOR INTEGRATING HEALTH CARE PAYERS AND PROVIDER SYSTEMS WITH HEALTH CARE TRANSACTION SYSTEMS USING A SINGLE HIPAA EDI RESPONSE GENERATION COMPONENT

(75) Inventors: Anh Q. Lu, Austin, TX (US); Gautham Pamu, Round Rock, TX (US); David Y. Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2761 days.

(21) Appl. No.: 12/185,178

(22) Filed: Aug. 4, 2008

(65) Prior Publication Data

US 2010/0030599 A1    Feb. 4, 2010

(51) Int. Cl.
*G06Q 10/10* (2012.01)
*G06Q 40/00* (2012.01)
*G06Q 50/22* (2018.01)

(52) U.S. Cl.
CPC ............. *G06Q 10/10* (2013.01); *G06Q 40/00* (2013.01); *G06Q 50/22* (2013.01)

(58) Field of Classification Search
None
See application file for complete search history.

(56) References Cited

U.S. PATENT DOCUMENTS

| | | | | |
|---|---|---|---|---|
| 5,644,778 A | * | 7/1997 | Burks | G06Q 40/02 705/2 |
| 5,946,669 A | * | 8/1999 | Polk | G06Q 20/02 705/38 |
| 6,009,475 A | * | 12/1999 | Shrader | H04L 63/0263 709/217 |
| 2002/0010679 A1 | * | 1/2002 | Felsher | G06F 19/328 705/51 |
| 2005/0228808 A1 | * | 10/2005 | Mamou | G06F 17/30563 |

(Continued)

OTHER PUBLICATIONS

IBM, "Software End of SERViCE: DataStage TX" Jul. 27, 2007.*

(Continued)

*Primary Examiner* — Neal Sereboff
(74) *Attorney, Agent, or Firm* — Schmeiser, Olsen & Watts, LLP; Mark Vallone

(57) ABSTRACT

A method, system, and computer program product for integrating Health Care Payers and Providers with a health care transaction system. The health care transaction (HCT) utility solves the problem of integration between these two parties by providing the developer with an application that is capable of automatically generating an Electronic Data Interchange (EDI) response message to a request. The HCT utility mainly consists of a servlet (associated with the Hypertext Transfer Protocol (HTTP) or other data communication protocol) that forwards an EDI request from a sending party to applications that may act as either a payer or provider. These applications may automatically process and respond to request EDI messages sent from other applications using an EDI processor application. The HCT utility provides the advantage of providing an infrastructure for testing healthcare transactions. Furthermore, the infrastructure enables testing of a variety of transactions from multiple sources. Additionally, clearinghouse testing may now be automated.

20 Claims, 10 Drawing Sheets

(56) References Cited

U.S. PATENT DOCUMENTS

2007/0061393 A1* 3/2007 Moore ............... G06F 17/3089
  709/201
2009/0287837 A1* 11/2009 Felsher ................ G06F 19/328
  709/229

OTHER PUBLICATIONS

IBM, "Implementing EDI Solutions" Oct. 2003.*
IBM, "SOA and WebServices Enablement of WebSphere Transformation Extender Maps Using WebSphere Message Broker" Nov. 2006.*
IBM, "IBM WebSphere Transformation Extender, Pack for HIPAA EDI, Version 4.2" Jun. 20, 2006.*
WEDI SNIP, "Transaction Compliance and Certification, Version 3.0" Aug. 26, 2002.*
IBM, "Setting up the EDI environment" 2005.*
Zubeldia, Kepa "Transaction Testing Methodology for X12 HIPAA Transactions" Feb. 2003.*
Zubeldia, Kepa "Transaction Testing Methodology for X12 HIPAA Transactions" Oct. 2001.*
Feinberg, David "HIPAA and X12, An Introduction" Jun. 2008.*
IBM, "Transformation Extender Pack for HIPAA EDI Version 4.3.2" Jun. 2002.*
Bussler, Christopher "B2B Protocol Standards and their Role in Semantic B2B Integration Engines" 2001 Bulletin of the IEEE Computer Society Technical Committee on Data Engineering.*
iSode "EDI Solutions" Nov. 23, 2007.*
Rajaraman "Building blocks of e-commerce" Sadhana vol. 30 Parts 2 and 3 Apr./ Jun. 2005.*
Council for Electronic Billing and Payment (CeBP) "Business-to-Business EIPP: Presentment Models and Payment Options" Jul. 2001.*

* cited by examiner

<InformationReceiver>
<PayerName> clinics, pharmacies, and other receivers
<PayerAddress>
<InformationSource>
<EntityIdentifierCode>
<EntityTypeQualifier>
<IdentificationCodeQualifier>
<IdentificationCodeValue>
<OrganizationName>
<Name>
Create Invalid Messages for different attributes
<HIPAATestCase>
  <Scenario>
<Subscriber>
  <SubscriberDataPoolName>
  <DataPoolType>

Subscriber Name
Subscriber Additional Information (Situational)
Subscriber Address (Situational)
Subscriber Demographic Information (Situational): Format of Birth Date, Birth Date, Gender
Subscriber Eligibility/Benefit Date (Situational): Date/Time Qualifier, Date Time Period
Subscriber Eligibility of Benefit Query Information: Service Type Code (Situational), Product Service Id Qualifier, Product Service Id, Coverage Level (Situational), Insurance Type Code (Situational)
Dependent
Dependent Name
Dependent Additional Information (Situational)
Dependent Address (Situational)
Dependent Relationship (Situational)
Provider Information (Situational)
Dependent Eligibility or Benefit Query Information: Service Type Code (Situational), Product Service Id Qualifier, Product Service Id, Coverage Level (Situational), Insurance Type Code (Situational)
Dependent Eligibility/Benefit Date

METHOD AND APPARATUS FOR INTEGRATING HEALTH CARE PAYERS AND PROVIDER SYSTEMS WITH HEALTH CARE TRANSACTION SYSTEMS USING A SINGLE HIPAA EDI RESPONSE GENERATION COMPONENT

BACKGROUND

1. Technical Field

The present invention generally relates to data processing systems and in particular to transaction facilities in data processing systems.

2. Description of the Related Art

The healthcare industry's payment and reimbursement system is notoriously complex and inefficient. Physicians bear the direct cost of this inefficiency in the form of manual processing, by incurring high administrative costs (approximating $6.2 billion), bad debt (approximating $3.0 billion) and slow payments (approximating $0.4 billion). Large employers and associated members finance this inefficiency indirectly through the higher cost of medical care. Although this inefficiency has been long recognized as a problem, a solution has so far eluded the marketplace primarily because the solution requires the cooperation of stakeholders with divergent and competing interests. There is a need for Health Care Transaction Solution that handles eligibility, benefits and claim filing.

Currently when developing a health care transaction solution that is involved with the storage, relay and exchange of eligibility, benefits, and claim filing related information the process of integrating the payers and providers poses a challenging problem.

SUMMARY OF ILLUSTRATIVE EMBODIMENTS

Disclosed are a method, system, and computer program product for integrating Health Care Payers and Providers with a health care transaction system. The health care transaction (HCT) utility solves the problem of integration between these two parties by providing the developer with an application that is capable of automatically generating an Electronic Data Interchange (EDI) response message to a request. The HCT utility mainly consists of a servlet (associated with the Hypertext Transfer Protocol (HTTP) or other data communication protocol) that forwards an EDI request from a sending party to applications that may act as either a payer or provider. These applications may automatically process and respond to request EDI messages sent from other applications using an EDI processor application. The HCT utility provides the advantage of providing an infrastructure for testing healthcare transactions. Furthermore, the infrastructure enables testing of a variety of transactions from multiple sources. Additionally, clearinghouse testing may now be automated.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 8 illustrates an example set of metadata used for testing a request, according to one embodiment;

FIG. 9 illustrates an example data pool used for testing a request, according to one embodiment.

DETAILED DESCRIPTION OF AN ILLUSTRATIVE EMBODIMENT

Figure 1:
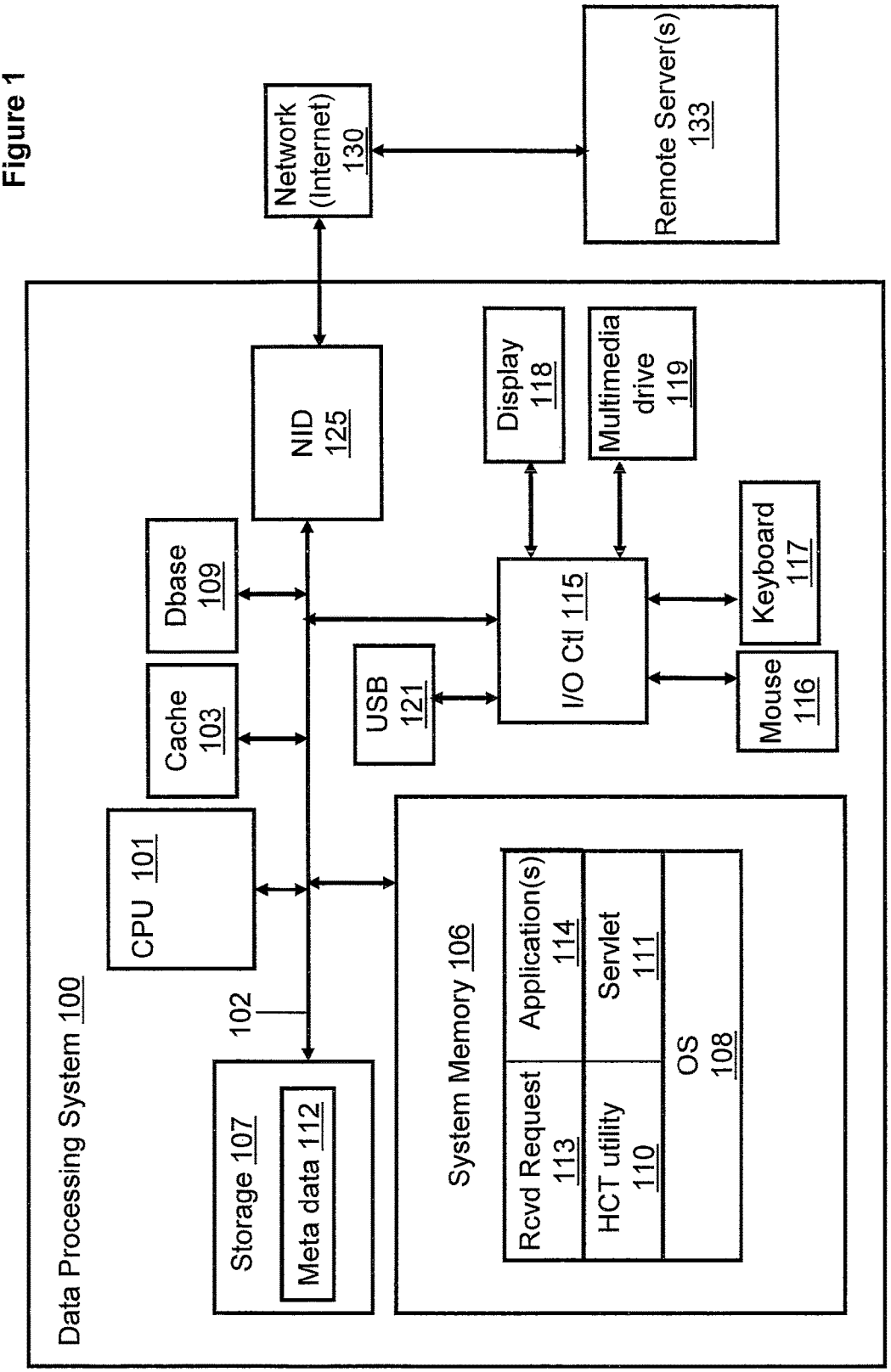
FIG. 1 is a block diagram representation of a data processing system, according to one embodiment.

The illustrative embodiments provide a method, system, and computer program product for integrating Health Care Payers and Providers with a health care transaction system. The health care transaction (HCT) utility solves the problem of integration between these two parties by providing the developer with an application that is capable of automatically generating an Electronic Data Interchange (EDI) response message to a request. The HCT utility mainly consists of a servlet (associated with the Hypertext Transfer Protocol (HTTP) or other data communication protocol) that forwards an EDI request from a sending party to applications that may act as either a payer or provider. These applications may automatically process and respond to request EDI messages sent from other applications using an EDI processor application. The HCT utility provides the advantage of providing an infrastructure for testing healthcare transactions. Furthermore, the infrastructure enables testing of a variety of transactions from multiple sources. Additionally, clearinghouse testing may now be automated.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more servers 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 (and/or storage 107) are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), applications 114, meta data 112, Hypertext Transfer Protocol (HTTP) Servlet 111 and Health Care Transaction (HCT) utility 110. In actual implementation, applications 114 and HCT utility 110 may be combined as a single application collectively providing the various functions of each individual software component when the corresponding code is executed by the CPU 101. For simplicity, HCT utility 110 is illustrated and described as a stand alone or separate software/firmware component, which provides specific functions, as described below.

CPU 101 executes HCT utility 110 as well as OS 108, which supports the user interface features of HCT utility 110. In the illustrative embodiment, HCT utility 110 generates/provides several graphical user interfaces (GUI) to enable user interaction with, or manipulation of, the functional features of the utility (110). Among the software code/instructions provided by HCT utility 110, and which are specific to the invention, are: (a) code for integrating a software application for provider care services and care payment with a transaction facility; (b) code for processing an EDI request message; (c) code for providing a testing facility to enable a test of variety of transactions; and (d) code for generating an EDI response message. For simplicity of the description, the collective body of code that enables these various features is referred to herein as HCT utility 110. According to the illustrative embodiment, when CPU 101 executes HCT utility 110, DPS 100 initiates a series of functional processes that enable the above functional features as well as additional features/functionality, which are described below within the description of FIGS. 2-10.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
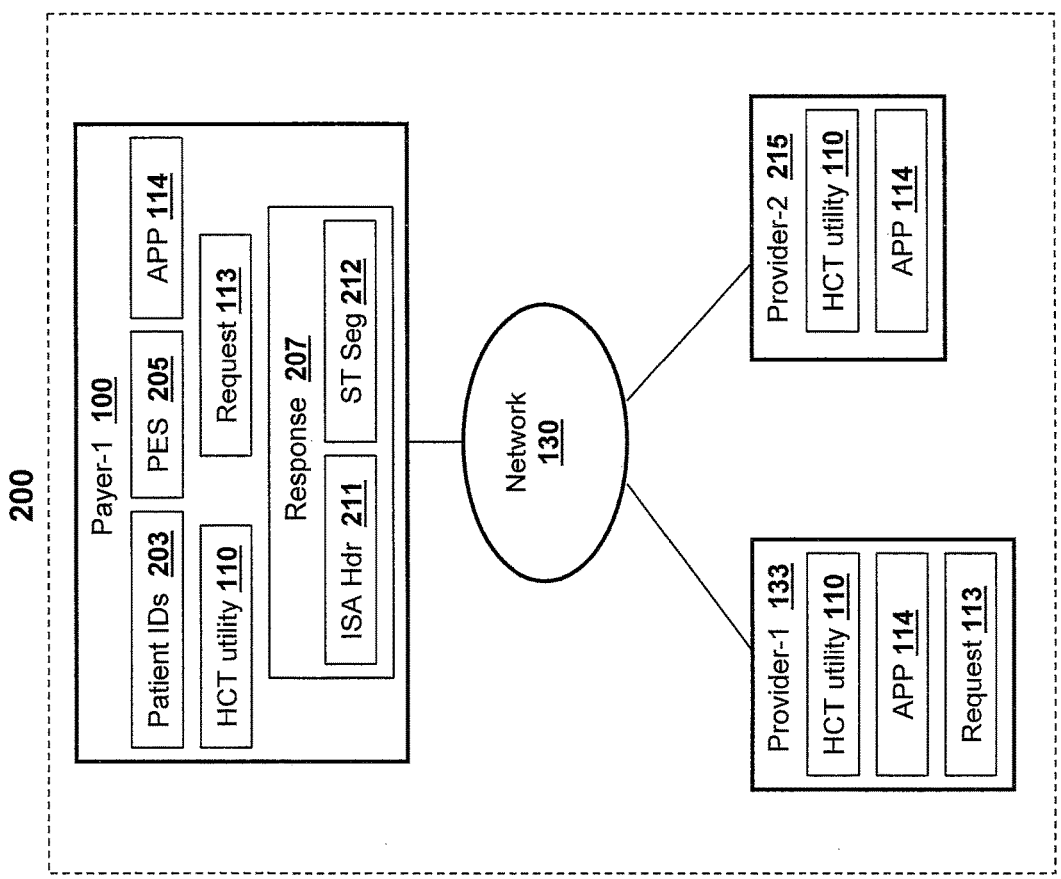
FIG. 2 illustrates a network, in which a client is running an application hosted by a server and exchanges messages with the server, according to one embodiment.

With reference now to FIG. 2, a network, in which a client is running a provider application exchanges messages with the server running a payer application, is illustrated, according to one embodiment. Network 200 comprises server/payer 100, client-1/provider-1 133 and client-2/provider-2 215. Provider-1 133 and provider-2 215 both connect to payer 100 via network 130. Provider-1 133 and provider-2 215 both comprise APP 114 and HCT utility 110. Similarly, payer 100 comprises APP 114 and HCT utility 110. Included in payer 100 is Patient/Subscriber ID file 203 and Patient/Subscriber Eligibility Status file 205. Payer 100 also comprises outgoing response 207. Response 207 comprises ISA header 211 and ST segment 212.

In network 200, server/payer 100 exchanges a series of messages with provider-1 133 in order to process a health care related transaction. In order to complete the transaction the following steps are executed: (1) HCT utility 110 detects receipt of (claim) request 113 from provider-1 133; (2) HCT utility 110 initiates the processing of request 113 at payer 100; (3) HCT utility 110 generates a response (e.g., response 207) to claim request 205; and (4) HCT utility 110 transmits outgoing response 207 to provider-1 133. In network 200, APP 114 represents a set of applications which collectively enables the preceding steps to take place. Further explanation of the transaction process and the applications represented and illustrated by APP 114 is facilitated by the following description of FIG. 3.

Figure 3:
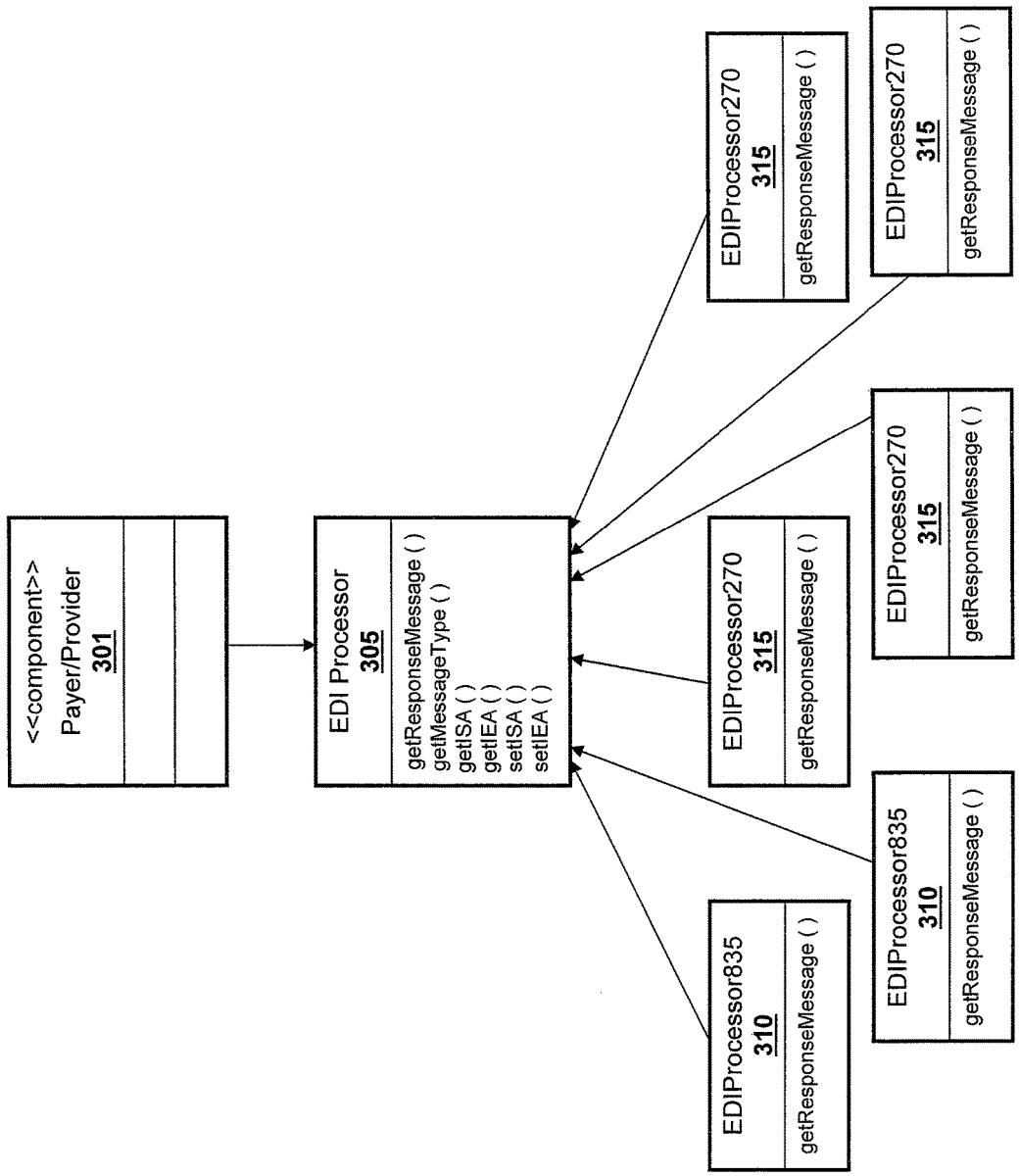
FIG. 3 illustrates the software components and interactions between components during the processing of requests, according to one embodiment.

FIG. 3 illustrates the application software components of a health care transaction system and interactions between components during the processing of requests, according to one embodiment. Application(s) 114 comprises payer/provider servlet 301. HCT utility 110 initiates response generation by forwarding the request from payer/provider 301 to EDI processor application 305. EDI processor application 305 implements a collection of EDI processor instances (including EDIProcessor835 310 and EDIProcessor270 315) to handle various message types.

In Application(s) 114, payer/provider servlet 301 responds to EDI messages using a set of EDI Processors (e.g., EDI processor application 305, EDIProcessor835 310 and EDIProcessor270 315). EDI processor application 305 is an abstract class that may be extended to implement various EDIProcessors (including EDIProcessor835 310 and EDIProcessor270 315) for handling the generation of responses for various message types. With the collective functionality of a set of payers and providers, payer/provider 301 reads the provider id or payer id and direct received message 205 to the appropriate EDIProcessor application. Each payer or provider basically consists of separate EDIProcessor instances that are used for incoming messages. When an incoming message arrives, the payer or provider processes the message and sends a response message back.

The processing of the request message involves creating values to use for the response message, e.g. looking up a patient's subscriber id 203 and finding the eligibility status of the patient for a service. In one embodiment, the look up of the patient's subscriber id and finding the patient's eligibility status (within Patient Eligibility Status (PES) file 205) for a service may occur during the response creation process. Creating an EDI response message for an EDI request message consists of using the values of the data in the request or values from database 109 to fill in the response fields. The process consists of creating an Industry Standard Architecture (ISA) header 211 and Transaction Set Header (ST) segments 212 that are the placeholder for the body of the response message. Furthermore, the process includes creating the loops and necessary segments that contain the appropriate response to the request message. The response generation process is aided by the collection of functions/methods 306 contained within EDI processor application 305. If a response message cannot be created for the incoming request, then an acknowledgment EDI message is returned to the sender (e.g., provider-1 133).

Figure 4:
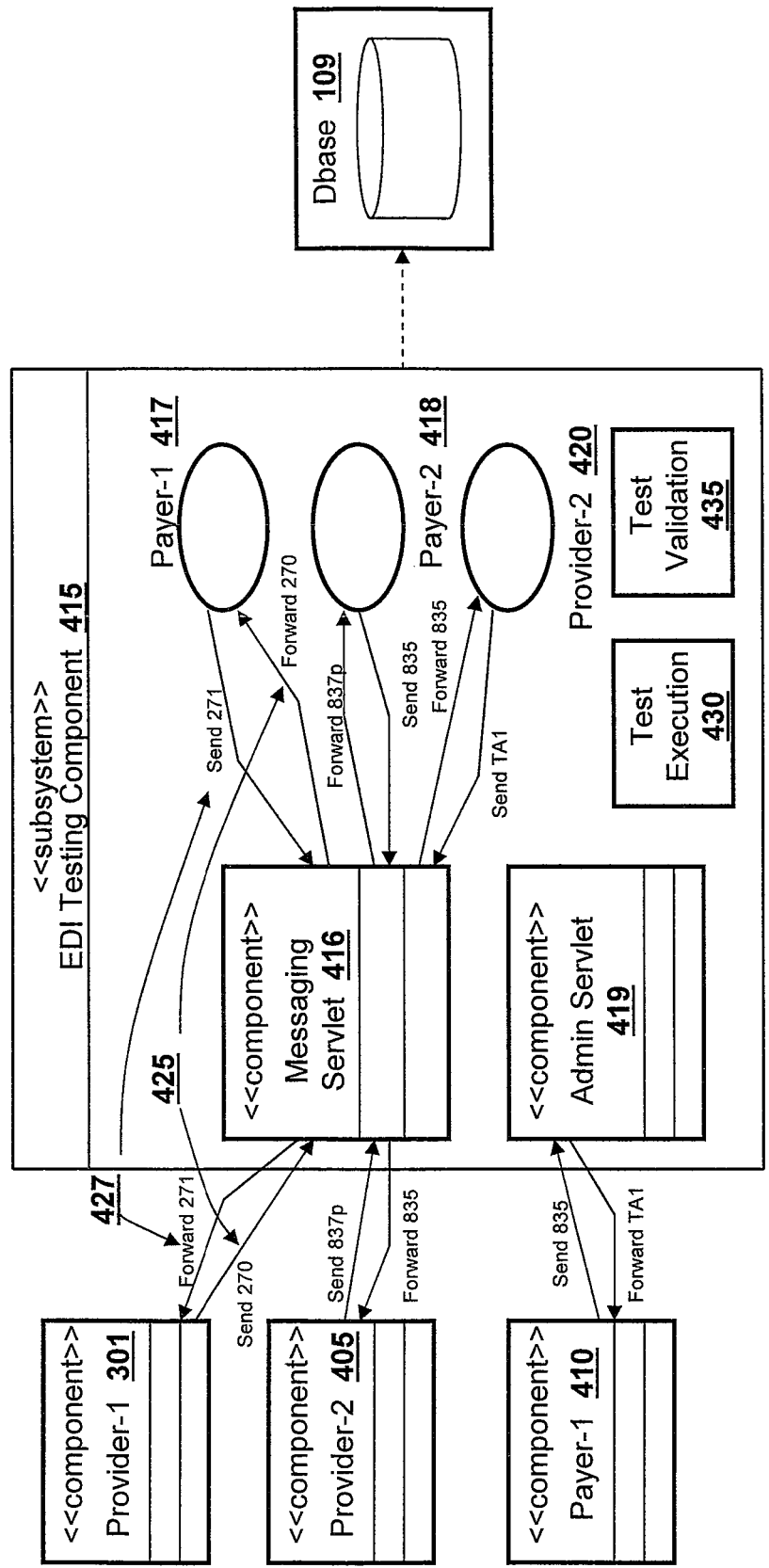
FIG. 4 illustrates the development of testing component, an administration console servlet and the integration of associated test functions and features, according to one embodiment.

FIG. 4 illustrates the development of a testing component, an administration console servlet and the integration of associated test functions and features, according to one embodiment. Testing System 400 comprises external provider-1 application 301, external provider-2 application 405 and external payer-1 application 410. Testing System 400 also depicts database 109. Testing System 400 also comprises EDI Testing Component 415. EDI Testing Component 415 further comprises Messaging Servlet application 416 that relays transaction messages (including request message-270 425 and response message-271 427) to/from an internal collection of payers and providers including internal payer-1 application 417 and internal provider-2 application 420. Additionally, Messaging Servlet application 416 relays transaction messages to/from external provider-1 application 301, external provider-2 application 405 and external payer-1 application 410.

Illustrated within EDI Testing Component 415 is Admin Servlet application 419. EDI Testing Component 415 also comprises Test Execution Engine 430 and Test Validation Engine 435. In actual implementation, Execution Engine 430 and Test Validation Engine 435 may be combined as a single application collectively providing the various functions of each individual software component when the corresponding code is executed by the CPU 101. For simplicity, however, Execution Engine 430 and Test Validation Engine 435 are illustrated and described as separate software components.

The Health Insurance Portability & Accountability Act (HIPAA) Test System (e.g., Test System 400) is used to test Health care transactions from Health care Providers (Hospital Claim Systems) or Payers (Insurance systems). Test system 400 verifies that the payer creates valid responses for the requests and verifies that the providers are creating valid requests. Test cases are built using test case meta data 112. Meta data 112 is an xml file that is stored in data store 107. Meta data (xml file) 112 is built using the data from the data pool. The data pool is populated using the subscribers data exported from the payer system/application or subscriber data created by the Test system 400/EDI Testing Component 415.

In one example test case, Test System 400 executes the functions of a test provider. The test execution engine 430 (contained within EDI Testing Component 415) reads the test case meta data from the data store. Test execution engine 430 builds the HIPAA requests based on these meta data. EDI Testing Component 415 sends HIPAA messages asynchronously to the external payer system. EDI Testing Component 415 also builds the expected responses for the HIPAA messages, stores the expected response and logs the request information in the data store (and within HIPAARequest table, for example).

Test System 400 processes the received messages through test validation engine 435. Validation engine 435 processes the responses from the payer asynchronously and identifies each response with corresponding requests using the ISA correlation id in the HIPAA Message. The engine validates the sections of the responses using the expected response. The engine publishes the results to the database after comparing the messages. As soon as all the responses for the requests are received, the engine updates the status of the test results in data store 107.

In Test System 400, Admin console servlet 419 may be developed to provide even greater flexibility by allowing users to configure database connections, create Payers and Providers, and configure Payers and Providers properties from a web browser interface.

In order to implement the content pack extensibility feature, a framework such as the Eclipse framework is adopted. The implementation core plug-in associated with the framework allows the Admin servlet to function as the main plug-in. Consequently, other EDI servlets may be installed via the Admin servlet as plug-in applications in order to allow an application to handle EDI requests for different industry types in a manner similar the message processing methods of Network 300 and Test System 400.

Figure 5:
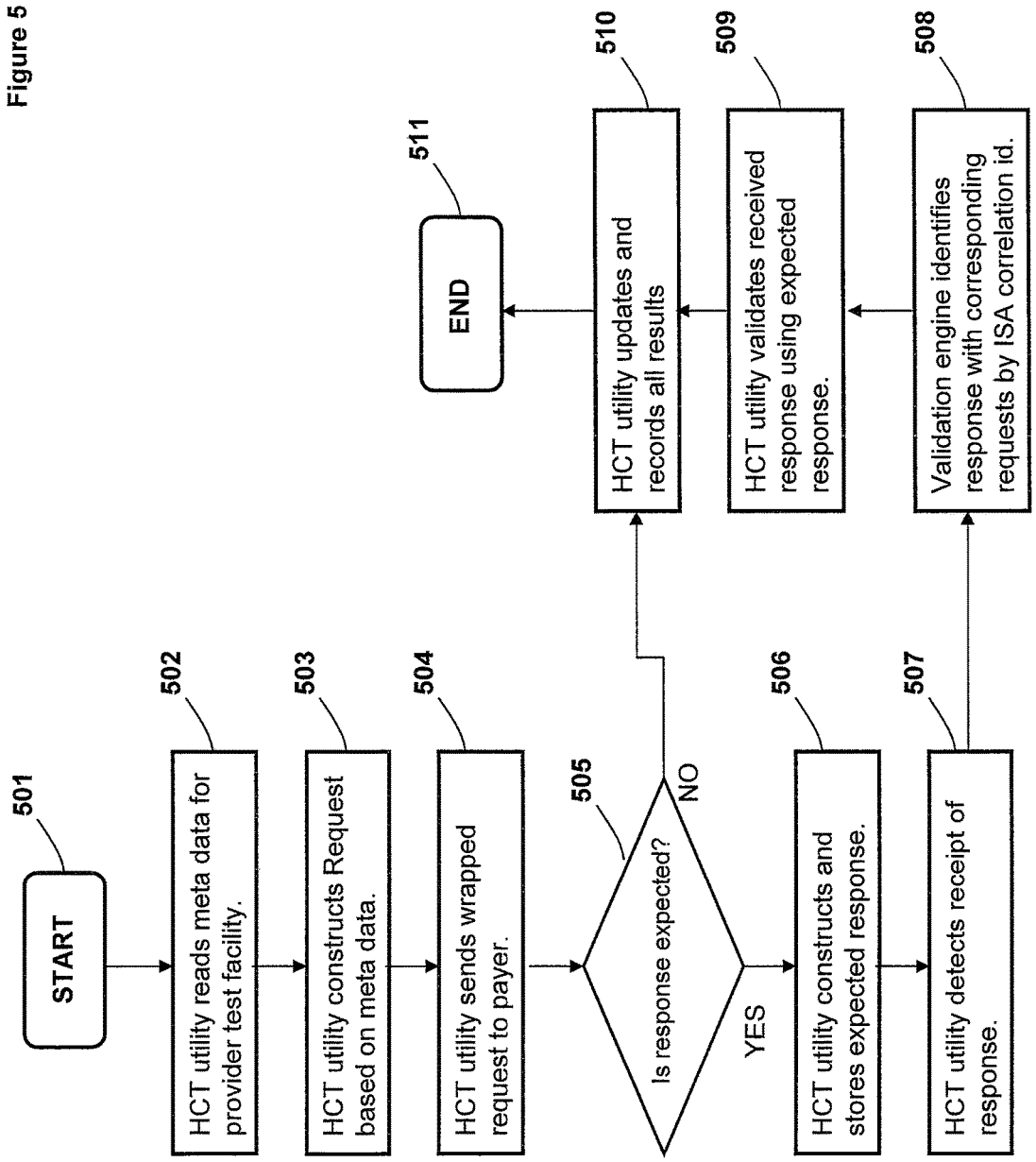
FIG. 5 is a flow chart illustrating the process of testing health care providers by sending EDI messages and validating payer responses, according to one embodiment.

FIG. 5 is a flow chart illustrating the process of testing health care providers by sending EDI messages and validating payer responses, according to one embodiment. Although the methods illustrated in FIG. 5 may be described with reference to components shown in FIGS. 1-4, it should be understood that this is merely for convenience and alternative components and/or configurations thereof can be employed when implementing the various methods. Key portions of the methods may be completed by HCT utility 110 executing within DPS 100 (FIG. 1) and controlling specific operations of/on DPS 100, and the methods are thus described from the perspective of either/both HCT utility 110 and DPS 100.

The process of FIG. 5 begins at initiator block 501 and proceeds to block 502, at which HCT utility 110 initiates a read of the meta data (from the data store) for a test case in which the transaction system operates as a provider in order to test payer systems. When collecting metadata, the user has the option of collecting data for the test case using a form, through random selection from a pool of values in a database, or by reusing an existing test case scenario. If the user is not re-using an existing test case scenario, the user may save the metadata as a rule based or static test case scenario. Rule based scenarios allow the system to randomly select data from a pool using various selection options.

At block 503, HCT utility 110 with the aid of test execution engine 430 builds the HIPAA requests based on the test case meta data and the type of request that is denoted in the test case. If data is randomly selected, then a message with a random message type is generated. In one embodiment, random requests may only be generated from selecting values from a database or by reusing a existing rule based test case.

Once the EDI message is generated, HCT utility 110 wraps the message with ISA headers to (asynchronously) send the message off to the external payer, as shown at block 504. At decision block 505, HCT utility 110 determines whether a response from the external payer is expected. If at block 505, HCT utility 110 determines that a response from the external payer is expected, the process proceeds to block 506, at which HCT utility 110 builds the expected responses for the HIPAA messages and logs the expected response with the associated request information in the data store. At block 507, HCT utility 110 detects receipt of a response (from the external payer) at test validation engine 435.

HCT utility 110 (with the aid of validation engine 435) initiates asynchronous processing of the response by identifying/associating the response with the corresponding request using the ISA correlation id in the response message, as shown at block 508.

At block 509, HCT utility 110 validates the response by comparing the sections (e.g., EDI segments) of the response with the expected response. The expected response may be a static pre-selected response or a dynamic response generated from the request. At block 510, HCT utility 110 stores all test results. If at block 506, HCT utility 110 determines that a response from the external payer is not expected, the process proceeds to block 510, at which, HCT utility 110 stores all test results. In other words, HCT utility 110 records all results for transaction events including response validity when applicable. The process ends at block 511.

Figure 6:
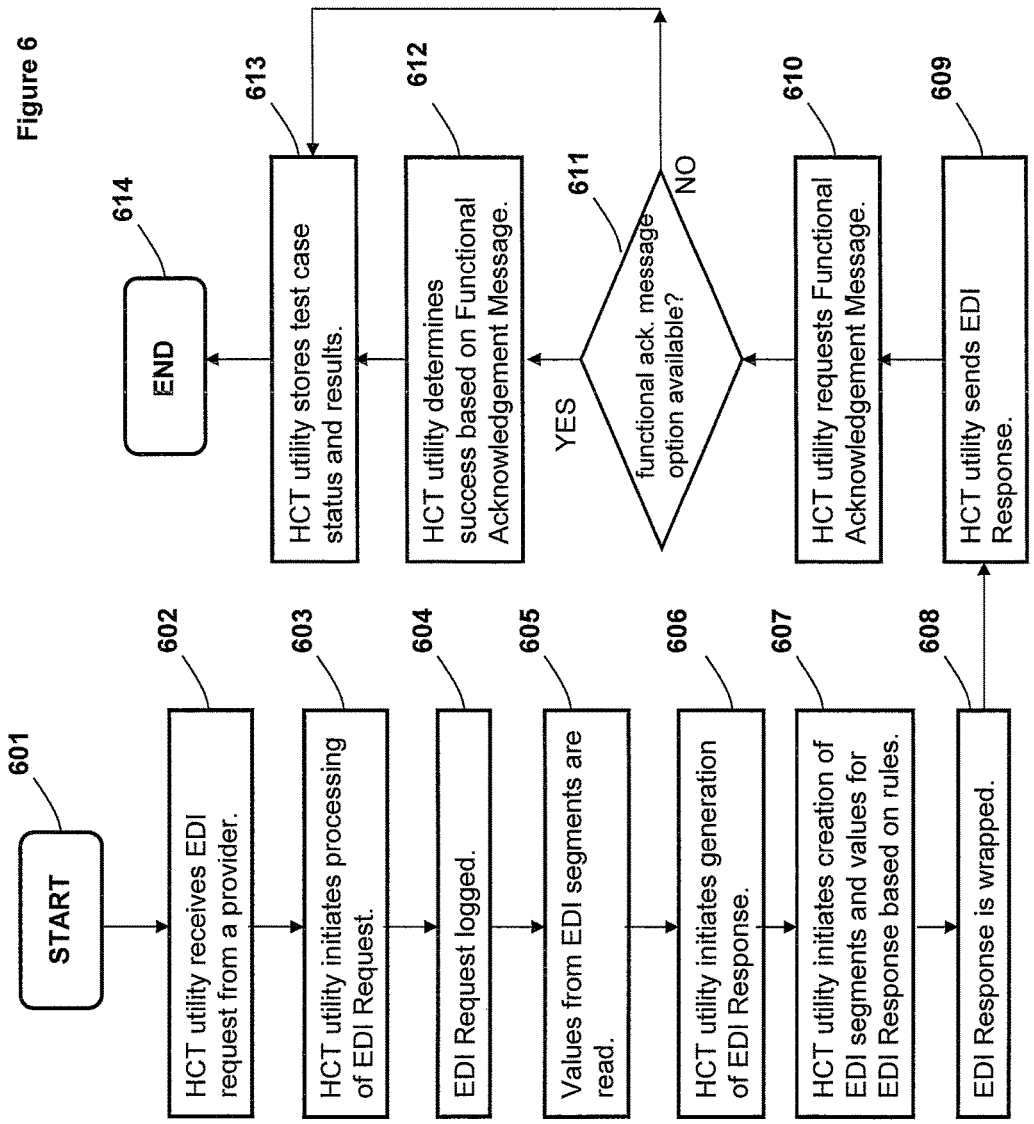
FIG. 6 is a flow chart illustrating the process in which the test system acts as a payer responding to EDI requests and testing the validity of responses, according to one embodiment.

FIG. 6 is a flow chart illustrating the process in which the test system acts as a payer responding to EDI requests and testing the validity of responses, according to one embodiment. Although the methods illustrated in FIG. 6 may be described with reference to components shown in FIGS. 1-5, it should be understood that this is merely for convenience and alternative components and/or configurations thereof can be employed when implementing the various methods. Key portions of the methods may be completed by HCT utility 110 executing within DPS 100 (FIG. 1) and controlling specific operations of/on DPS 100, and the methods are thus described from the perspective of either/both HCT utility 110 and DPS 100.

The process of FIG. 6 begins at initiator block 601 and proceeds to block 602, at which HCT utility 110 receives at a payer facility an EDI request from a provider. At block 603, HCT utility 110 initiates processing of the EDI request. The EDI request is logged, as shown at block 604. At block 605, the values from the EDI segments are read. At block 606, HCT utility 110 initiates generation of the EDI response. HCT utility 110 initiates creation of EDI segments and values for the EDI Response, as shown at block 607. At block 608, the EDI response is wrapped with ISA headers. HCT utility 110 sends the response to the provider, as shown at block 609. HCT utility 110 requests a Functional Acknowledgement Message/Option (FAM), as shown at block 610. At decision block 611, HCT utility 110 determines whether the FAM option is available at/from the provider.

If at block 611, HCT utility 110 determines that the FAM option is available, the process proceeds to block 612, at which HCT utility 110 determines test success based on the contents of the FAM. The FAM may, for example, indicate whether semantic errors are present in the response message. At block 612, HCT utility 110 stores test case status and results. If at block 611, HCT utility 110 determines that the FAM is not available, the process proceeds to block 613, at which, HCT utility 110 stores test case status and results (without receipt of a return response). In other words, HCT utility 110 concludes the transaction with the transmission of the response. The process ends at block 614.

Figure 7:
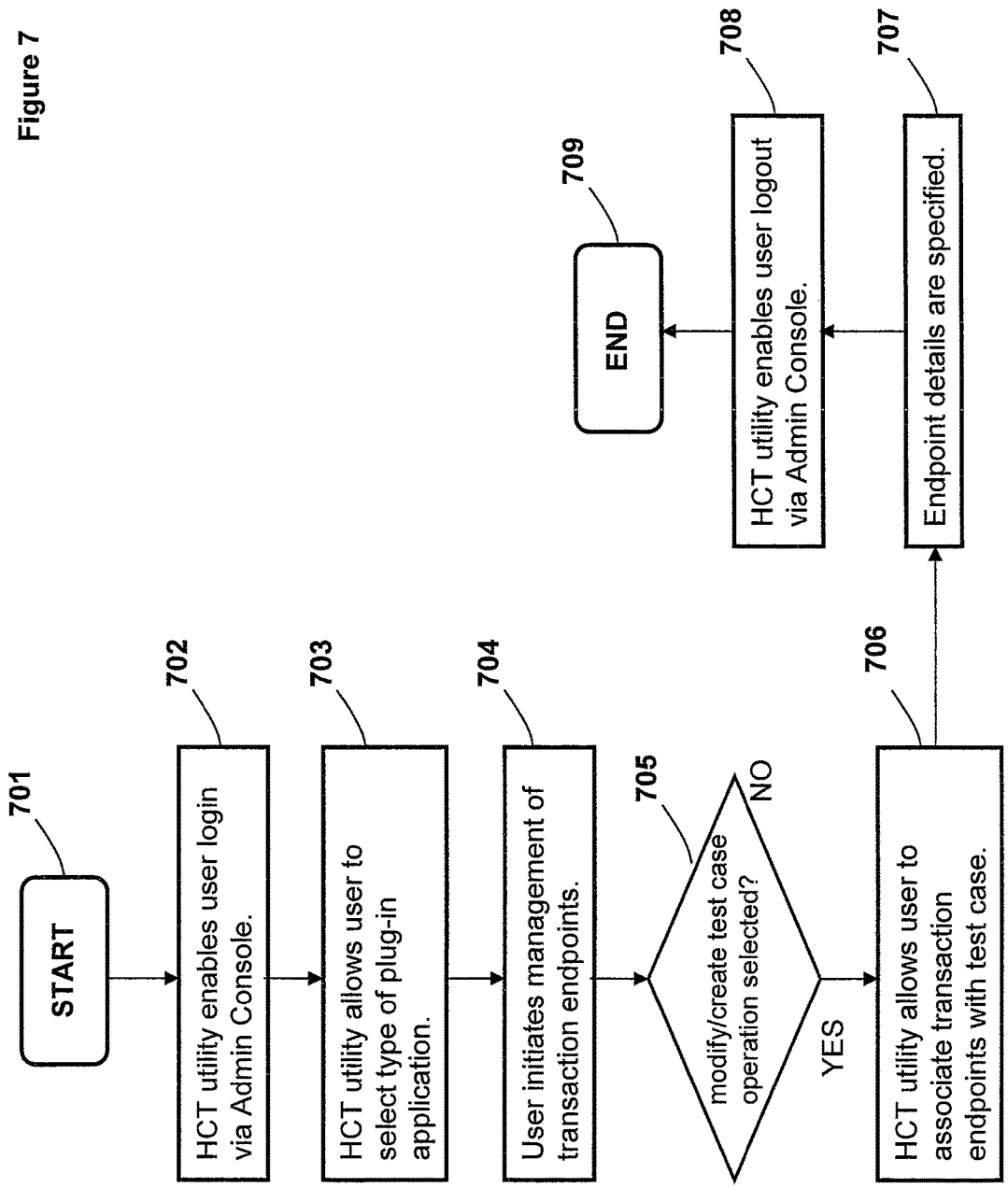
FIG. 7 is a flow chart illustrating the process of utilizing the administration console to manage transaction endpoints and test cases, according to one embodiment.

FIG. 7 is a flow chart illustrating the process of utilizing the administration console to manage transaction endpoints and test cases, according to one embodiment. Although the methods illustrated in FIG. 7 may be described with reference to components shown in FIGS. 1-6, it should be understood that this is merely for convenience and alternative components and/or configurations thereof can be employed when implementing the various methods. Key portions of the methods may be completed by HCT utility 110 executing within DPS 100 (FIG. 1) and controlling specific operations of/on DPS 100, and the methods are thus described from the perspective of either/both HCT utility 110 and DPS 100.

The process of FIG. 7 begins at initiator block 701 and proceeds to block 702, at which HCT utility 110 enables a user login via the Admin console. At block 703, HCT utility 110 allows a user to select a type of plug-in (i.e., related to a particular industry) to use (or install) in order to execute a task(s). HCT utility 110 enables user management of associated test cases or transaction endpoints, as shown at block 704. In particular, a test case manager may be used for one or more of: (1) creating test cases; (2) modifying test cases; (3) deleting test cases; (4) running test cases; and (5) viewing a test case's status. At decision block 705, HCT utility 110 determines whether the user chooses to create or modify test cases. If at decision block 705 HCT utility 110 determines that the user does not choose to create or modify test cases, the process proceeds to block 708, at which HCT utility 110 facilitates a user logout operation. If at decision block 705 HCT utility 110 determines that the user chooses to create or modify test cases, the process proceeds to block 706, at which, HCT utility 110 allows the user to associate transaction endpoints with the test case. At block 707, HCT utility 110 allows the user to specify endpoint details. For example, these endpoints may be specified as either an internal or external application that the user is integrating in test transaction system 400.

In one embodiment, a Transaction Endpoints Manager facility, for example, may be used to specify the details of these endpoints to use for various test cases. In a test case for integrating HealthCare Payers and Providers, a facility that provides the features and functionality of an internal payer (endpoint) or internal provider (endpoint) may be created. Furthermore, a reference external payer or reference external provider may be created for test cases.

The process ends at block 709.

FIG. 8 illustrates an example set of metadata used for testing a request, according to one embodiment. Meta data 112 is utilized in an example test case associated with HIPAA-270 Request 425 (FIG. 4). The test case is built using test case meta data 112. Meta data 112 is an xml file that is stored in the data store 107. The xml file is built using the data in the data pool (file), illustrated in FIG. 10.

FIG. 9 illustrates an example data pool used for testing a request, according to one embodiment. Data in the data pool (file) 900 is used to build test case meta data 112, illustrated in FIG. 8. Data pool 900 is populated using the subscribers data exported from the payer system or subscriber data created by the tester system. Data pool 900 contains various subscribers' information. Data pool 900 also contains information about subscriber dependents.

Figure 10:
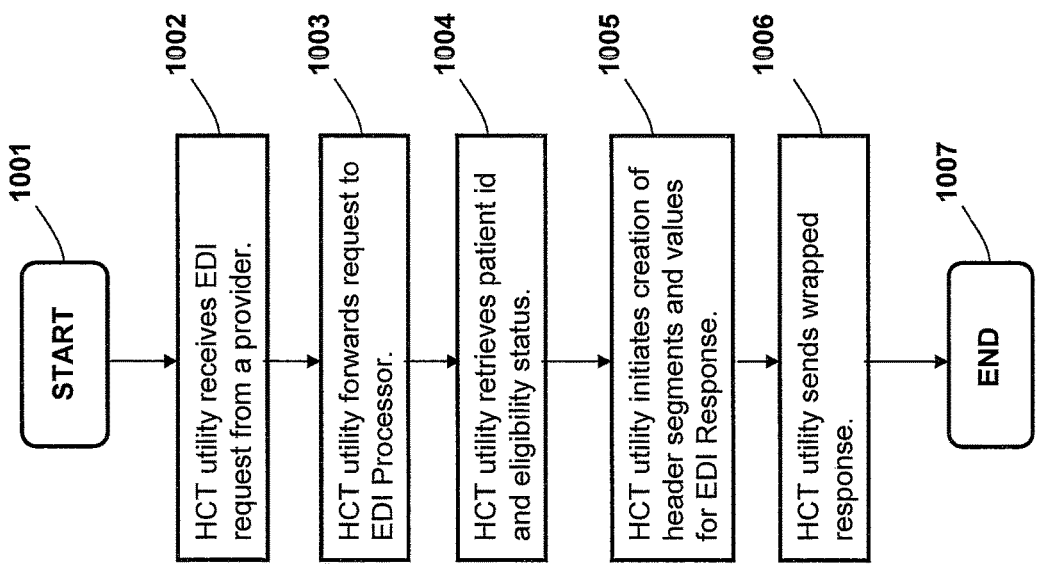
FIG. 10 is a flow chart illustrating the processing of EDI requests, according to one embodiment.

FIG. 10 is a flow chart illustrating the processing of EDI requests, according to one embodiment. Although the methods illustrated in FIG. 10 may be described with reference to components shown in FIGS. 1-9, it should be understood that this is merely for convenience and alternative components and/or configurations thereof can be employed when implementing the various methods. Key portions of the methods may be completed by HCT utility 110 executing within DPS 100 (FIG. 1) and controlling specific operations of/on DPS 100, and the methods are thus described from the perspective of either/both HCT utility 110 and DPS 100.

The process of FIG. 10 begins at initiator block 1001 and proceeds to block 1002, at which HCT utility 110 receives an EDI request from a payer or a provider. At block 1003, HCT utility 110 forwards the request to an EDI Processor. HCT utility 110 retrieves patient id and eligibility status, as shown at block 1004. At block 1005, HCT utility 110 initiates creation of header segments (for wrapping the response) and values for the EDI Response. At block 1006, HCT utility 110 sends a wrapped response to the provider. The process ends at block 1007.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:
   integrating software endpoint applications with a single transaction facility to enable transactions between a first endpoint and a second endpoint, wherein the first endpoint and the second endpoint are respectively represented by a service provider computer and a service payer computer, and wherein said integrating supports integrating operations of the service provider computer and the service payer computer in the data processing system;
   providing a testing facility to enable a test of a variety of transactions;
   automating a clearinghouse test procedure via the testing facility;
   providing an application plug-in facility to enable a simultaneous testing of multiple Electronic Data Interchange (EDI) exchanges;
   receiving an EDI request message from the first endpoint;
   generating an EDI response message in response to the EDI request message; and
   in response to the EDI response message being generated, transmitting the EDI response message to the first endpoint.

2. The method of claim 1, wherein said generating comprises:
   filling in response fields with the values related to data in the request or data from the database;
   creating one or more of an Industry Standard Architecture (ISA) header and Transaction Set Header (ST) segments;

constructing, using with one or more of the ISA header and the ST segments, a placeholder representing a body of the response message; and developing a set of loops and a group of segments to contain the response message.

3. The method of claim 1, comprising:

collecting data for a data pool from subscriber data exported from a payer system or subscriber data created by the testing facility;

constructing metadata with data from a data pool;

building a set of test cases using the metadata, wherein said metadata has an xml file format;

obtaining a test case metadata from the data store;

building a test request message based on the metadata;

evaluating a payer facility with an aid of the test provider facility;

sending test request messages synchronously to the payer system;

logging request information in the data store;

building an expected response for the test request message;

identifying a response for a corresponding request using an Industry Standard Architecture (ISA) correlation ID in the request message;

validating sections of the responses based on a comparison with the expected response; and publishing the results to the data store after comparing the messages.

4. The method of claim 1, comprising:

in response to a receipt of the response corresponding to the request, updating the status of the test results in the data store;

obtaining metadata for the test case by one or more of (a) random selection from a pool of values in a database and (b) reuse of an existing test case data;

generating the request based on the type of request that is denoted in the test case, and utilizing the data and the test case metadata;

when a current selection of metadata is not obtained from the reuse of an existing test case data, saving the current selection of metadata as a rule based case or a static test case, wherein said rule based case enables a random selection of data from a pool based on one or more data selection options;

in response to a random selection of metadata, generating a response message with a random message type, wherein a random request is generated from one or more of (a) a selection of values from a database or (b) reuse of an existing rule based test case;

in response to EDI response message generation, wrapping the EDI message with Industry Standard Architecture (ISA) headers to send off to the external Payer;

monitoring for receipt of a response to the transmitted message;

comparing the response with one of a static pre-selected response or a dynamic response generated from the request, wherein a result of a comparison of the response is focused on selected values in EDI segments;

when the service payer computer or a computer which receives the response does not provide an acknowledgment reply, concluding the testing process without receipt of the acknowledgment reply; and upon completion of the service payer computer testing, updating the database with the test case results.

5. The method of claim 1, comprising:

configuring a payer test facility;

initiating an evaluation of the service provider computer utilizing the test payer facility;

after said receiving the EDI request message, logging the EDI request message;

reading values from EDI segments inside the request message;

creating basic EDI Segments for a response message;

dynamically creating values based on Health Insurance Portability & Accountability Act (HIPAA) transaction guidelines and payer options;

constructing the response message with a subset of the values;

in response to a successful creation of the basic EDI segments, wrapping the EDI segments with an Industry Standard Architecture (ISA) header;

sending the response message having one or more wrapped EDI segments;

determining whether the external provider accepts the generated EDI response message based on a request for a functional acknowledgment message, wherein said acknowledgment message provides information about the presence of semantic errors in the transmitted response message; and in response to the service provider computer which receives the response not providing an option to provide the acknowledgment message, concluding the testing process without receipt of the acknowledgment message reply.

6. The method of claim 1, comprising:

providing an administration console facility;

providing a login facility to control at least one of (a) access to features and (b) initiation of tasks within an administration console;

in response to completion of a successful login, enabling access to console features and execution of tasks within the administration console;

configuring a set of database connections;

creating one or more test payer facilities and one or more test provider facilities;

initiating a configuration of a first set of properties of a test payer facility and a second set of properties of a test provider facility, wherein the configuration is initiated via a web browser interface;

selecting a type of plug-in application to use;

in response to a selection of a plug-in application, enabling a management of test cases or transaction endpoints via a test case manager, wherein said test case manager enables one or more of: creation of a test case; modification of the test case; deletion of the test case; execution of the test case; and identification of a status of the test case;

during the creation or the modification of the test case, enabling an association of transaction endpoints with the test case, wherein said endpoints are associated with one or more of (a) internal applications useful to an integration of a facility and (b) external applications useful to an integration;

specifying, via a facility that manages transaction endpoints, details of endpoints for use in various test cases; and during the integration of HealthCare Payers and Providers facility, creating a facility for test cases that operates as one or more of: an internal payer; an internal provider; a reference external payer; and a reference external provider.

7. The method of claim 1, wherein the data processing system comprises an apparatus, wherein the apparatus comprises a processor and a read-only memory (ROM) hardwired into the apparatus, said ROM containing program code, which upon being executed by the processor, implements the method, and wherein the apparatus is a special purpose machine specific to the method due to the ROM being hard wired into the apparatus.

8. The method of claim 1, further comprising:
requesting a Functional Acknowledgement Message (FAM) from the service provider computer; and
determining from the FAM message received from the service provider computer that the EDI response is valid.

9. A computer program product, comprising:
a non-transitory computer readable storage medium; and
program code on said computer readable storage medium that when executed within a data communication device generating application data, said program code being for:
  integrating software endpoint applications with a single transaction facility to enable transactions between a first endpoint and a second endpoint, wherein the first endpoint and the second endpoint are respectively represented by a service provider computer and a service payer computer, and wherein said integrating supports integrating operations of the service provider computer and the service payer computer in a data processing system;
  providing a testing facility to enable a test of a variety of transactions;
  automating a clearinghouse test procedure via the testing facility;
  providing an application plug-in facility to enable a simultaneous testing of multiple Electronic Data Interchange (EDI) exchanges;
  receiving an EDI request message from the first endpoint;
  generating an EDI response message in response to the EDI request message; and
  in response to the EDI response message being generated, transmitting the EDI response message to the first endpoint.

10. The computer program product of claim 9, wherein said program code for generating comprises program code for:
  filling in response fields with the values related to data in the request or data from the database;
  creating one or more of a Industry Standard Architecture (ISA) header and Transaction Set Header (ST) segments;
  constructing, using with one or more of the ISA header and the ST segments, a placeholder representing a body of the response message; and
  developing a set of loops and a group of segments to contain the response message.

11. The computer program product of claim 9, wherein said program code comprises program code for:
  collecting data for a data pool from subscriber data exported from a payer system or subscriber data created by the testing facility;
  constructing metadata with data from a data pool;
  building a set of test cases using the metadata, wherein said metadata has an xml file format;
  obtaining a test case metadata from the data store;
  building a test request message based on the metadata;
  evaluating a payer facility with an aid of the test provider facility;
  sending test request messages synchronously to the payer system;
  logging request information in the data store;
  building an expected response for the test request message;
  identifying a response for a corresponding request using the Industry Standard Architecture (ISA) correlation ID in the request message;
  validating sections of the responses based on a comparison with the expected response; and
  publishing the results to the data store after comparing the messages.

12. The computer program product of claim 9, wherein said program code comprises program code for:
  in response to a receipt of the response corresponding to the request, updating the status of the test results in the data store;
  obtaining metadata for the test case by one or more of (a) random selection from a pool of values in a database and (b) reuse of an existing test case data;
  generating the request based on the type of request that is denoted in the test case, and utilizing the data and the test case metadata;
  when a current selection of metadata is not obtained from the reuse of an existing test case data, saving the current selection of metadata as a rule based case or a static test case, wherein said rule based case enables a random selection of data from a pool based on one or more data selection options;
  in response to a random selection of metadata, generating a response message with a random message type, wherein a random request is generated from one or more of (a) a selection of values from a database or (b) reuse of an existing rule based test case;
  in response to EDI response message generation, wrapping the EDI message with Industry Standard Architecture (ISA) headers to send off to the external Payer;
  monitoring for receipt of a response to the transmitted message;
  comparing the response with one of a static pre-selected response or a dynamic response generated from the request, wherein a result of a comparison of the response is focused on selected values in EDI segments;
  when the service payer computer or a computer which receives the response does not provide an acknowledgment reply, concluding the testing process without receipt of the acknowledgment reply; and
  upon completion of the service payer computer testing, updating the database with the test case results.

13. The computer program product of claim 9, wherein said program code comprises program code for:
  configuring a payer test facility;
  initiating an evaluation of the service provider computer utilizing the test payer facility;
  after said receiving the EDI request message, logging the EDI request message;
  reading the values from EDI segments inside the request message;
  creating basic EDI Segments for a response message;
  dynamically creating the values based on Health Insurance Portability & Accountability Act (HIPAA) transaction guidelines and payer options;
  constructing the response message with a subset of the values;

in response to a successful creation of the basic EDI segments, wrapping the EDI segments with an Industry Standard Architecture (ISA) header;

sending the response message having one or more wrapped EDI segments;

determining whether the external provider accepts the generated EDI response message based on a request for a functional acknowledgment message, wherein said acknowledgment message provides information about the presence of semantic errors in the transmitted response message; and in response to the service provider computer which receives the response not providing an option to provide the acknowledgment message, concluding the testing process without receipt of the acknowledgment message reply.

14. The computer program product of claim 9, wherein said program code comprises program code for:

providing an administration console facility;

providing a login facility to control at least one of (a) access to features and (b) initiation of tasks within an administration console;

in response to completion of a successful login, enabling access to console features and execution of tasks within the administration console;

configuring a set of database connections;

creating one or more test payer facilities and one or more test provider facilities;

initiating a configuration of a first set of properties of a test payer facility and a second set of properties of a test provider facility, wherein the configuration is initiated via a web browser interface;

selecting a type of plug-in application to use;

in response to a selection of a plug-in application, enabling a management of test cases or transaction endpoints via a test case manager, wherein said test case manager enables one or more of: creation of a test case; modification of the test case; deletion of the test case; execution of the test case; and identification of a status of the test case;

during the creation or the modification of the test case, enabling an association of transaction endpoints with the test case, wherein said endpoints are associated with one or more of (a) internal applications useful to an integration of a facility and (b) external applications useful to an integration;

specifying, via a facility that manages transaction endpoints, details of endpoints for use in various test cases; and during the integration of HealthCare Payers and Providers facility, creating a facility for test cases that operates as one or more of: an internal payer; an internal provider; a reference external payer; and a reference external provider.

15. The computer program product of claim 9, wherein the data communication device comprises the storage medium, wherein the storage medium comprises a read-only memory (ROM) hard-wired into the data communication device, wherein the ROM contains the program code, and wherein the apparatus is a special purpose machine specific to the program code due to the ROM being hard wired into the data communication device.

16. The method of claim 9, comprising program code for:

after said transmitting the EDI response message, requesting a Functional Acknowledgement Message (FAM) from the service provider computer; and determining from the FAM message received from the service provider computer that the EDI response is valid.

17. A data processing system, comprising:

a processor executing a servlet application;

a memory system;

a network mechanism that enables connecting of data processing systems;

a utility which when executed in said data processing system provides functions for:

integrating software endpoint applications with a single transaction facility to enable transactions between a first endpoint and a second endpoint, wherein the first endpoint and the second endpoint are respectively represented by a service provider computer and a service payer computer, and wherein said integrating supports integrating operations of the service provider computer and the service payer computer in the data processing system;

providing a testing facility to enable a test of a variety of transactions;

means for automating a clearinghouse test procedure via the testing facility;

providing an application plug-in facility to enable a simultaneous testing of multiple Electronic Data Interchange (EDI) exchanges;

receiving an EDI request message from the first endpoint;

generating an EDI response message in response to the EDI request message; and in response to the EDI response message being generated, transmitting the EDI response message to the first endpoint.

18. The data processing system of claim 17, wherein said functions for generating comprises functions for:

filling in response fields with the values related to data in the request or data from the database;

creating one or more of a Industry Standard Architecture (ISA) header and Transaction Set Header (ST) segments;

constructing, using with one or more of the ISA header and the ST segments, a placeholder representing a body of the response message; and developing a set of loops and a group of segments to contain the response message.

19. The data processing system of claim 17, wherein said utility comprises functions for:

collecting data for a data pool from subscriber data exported from a payer system or subscriber data created by the testing facility;

constructing metadata with data from a data pool;

building a set of test cases using the metadata, wherein said metadata has an xml file format;

obtaining a test case metadata from the data store;

building a test request message based on the metadata;

evaluating a payer facility with an aid of the test provider facility;

sending test request messages synchronously to the payer system;

logging request information in the data store;

building an expected response for the test request message;

identifying a response for a corresponding request using the ISA correlation ID in the request message;

validating sections of the responses based on a comparison with the expected response; and publishing the results to the data store after comparing the messages.

20. The data processing system of claim 17, wherein the data processing system comprises an apparatus, wherein the apparatus comprises the processor and the memory system, wherein the memory system comprises a read-only memory (ROM) hard-wired into the apparatus, wherein the ROM contains program code for implementing the functions provided by the utility, and wherein the apparatus is a special purpose machine specific to the functions provided by the utility due to the ROM being hard wired into the apparatus.

* * * * *